May 22, 1956    A. B. POOLE    2,747,116
REVERSIBLE DIRECT-CURRENT MOTOR
Filed Aug. 10, 1953
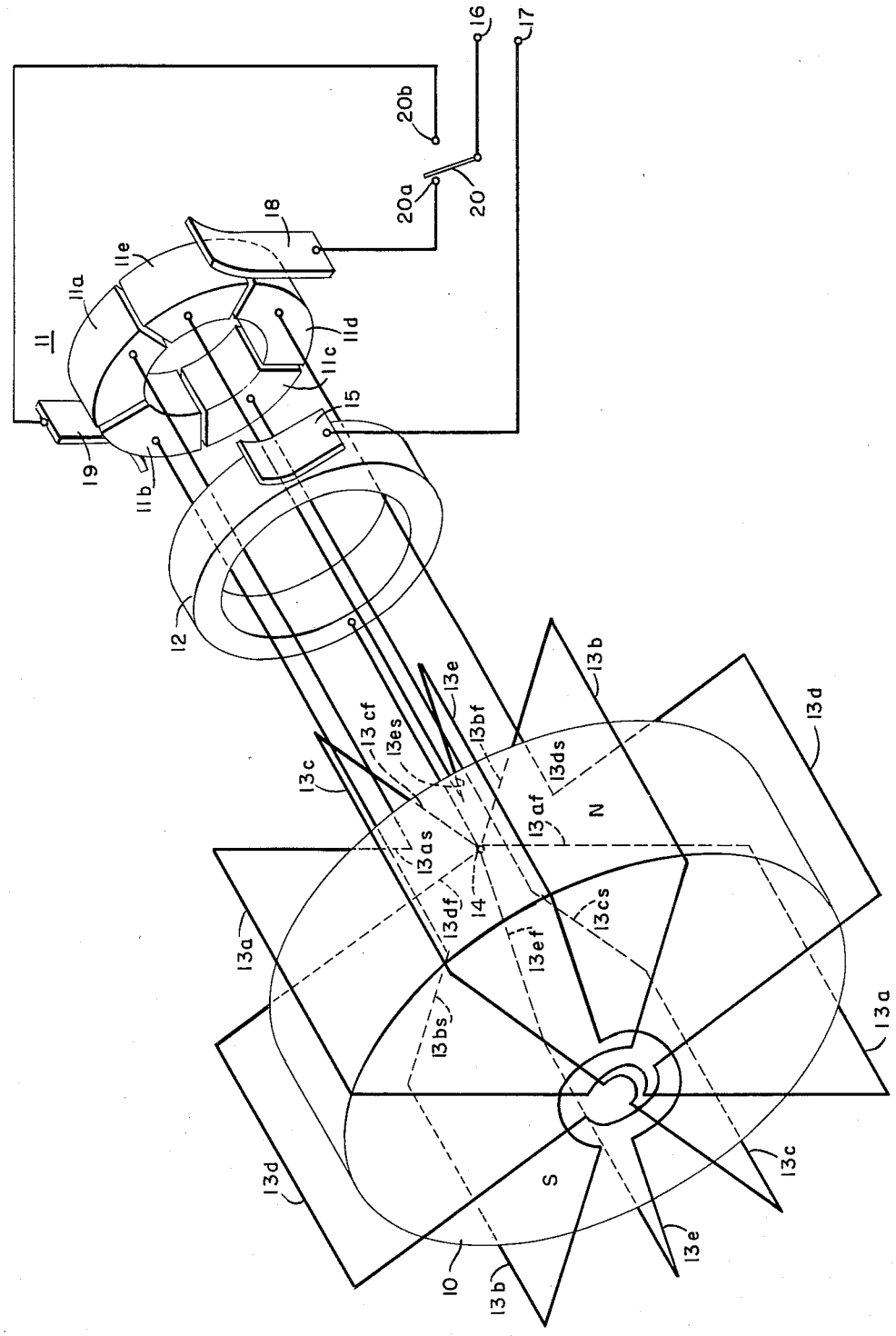

United States Patent Office 2,747,116
Patented May 22, 1956

2,747,116

REVERSIBLE DIRECT-CURRENT MOTOR

Arthur B. Poole, Harwinton, Conn., assignor to Haydon Manufacturing Company, Inc., a corporation of Connecticut Application August 10, 1953, Serial No. 373,291

3 Claims. (Cl. 310—128)

This invention relates to reversible direct-current motors and, while it is of general application, it is particularly suitable for embodiment in miniature control motors.

With the rapidly expanding use of miniature control motors in industrial processes and controls and military electronic equipments, such as computers, there has arisen considerable demand for reversible direct-current motors. Such motors of the prior art are customarily reversed by reversing the connections of the field coils or of the armature brushes to a two-wire direct-current supply circuit. Either of these procedures involves the use of a double-pole double-throw switch, relay, or equivalent. In certain applications the use of a relay having contacts suitable for double-pole double-throw operation is undesirable because the relay contacts must be adjusted so that the contacts in the two branches of the circuit open and close simultaneously. This is particularly true in certain simple servo operations where the motor is given alternate current pulses in the forward and reverse directions. In such an application, a poorly adjusted relay distorts the rotation of the motor. This is undesirable because the motion of the motor is intended accurately to depict the condition which is being sensed and, hence, appears as a directive in the relay coil.

By using a relay having a single-pole double-throw arrangement of contacts, it is much easier to adjust these contacts faithfully to transmit the conditions impressed on the coil of the relay. Thus, if a motor which is capable of being reversed with a simple single-pole double-throw switching arrangement is used with a single-pole double-throw relay, the motion of the motor will more accurately reflect the pattern of the currents exciting the relay coil than would be the case of a conventional motor used with a double-pole double-throw relay, whose contacts were not accurately adjusted.

It is an object of the present invention, therefore, to provide a new and improved reversible direct-current motor which can be reversed by the operation of a single-pole double-throw switch.

In accordance with the invention, in a reversible direct-current motor including a field member having $p$ pairs of angularly spaced poles of opposite polarities there is provided an armature member rotatable relative to the field member and disposed in electrodynamic relation thereto comprising a commutator having $n$ segments per pair of field poles, and $n$ angularly spaced open windings per pair of field poles disposed to develop an armature field having $p$ pairs of angularly spaced poles of opposite polarities, each having one end individually connected to a corresponding one of the commutator segments, the other ends of the windings being connected together for connection to one terminal of a direct-current supply circuit engaging the slip ring and a pair of brushes per pair of field poles for selective connection to the other terminal of the supply circuit individually engaging the commutator at points spaced by approximately 180 electrical degrees to effect rotation of the motor in either direction.

For a better understanding of the present invention, together with other and further objects thereof, reference is had to the following description taken in connection with the accompanying drawing, while its scope will be pointed out in the appended claims.

The single figure of the drawing is a schematic diagram of a reversible direct-current motor embodying the invention.

Referring now more particularly to the drawing, there is represented schematically a reversible direct-current motor embodying the invention and including a field member 10 shown schematically as a cylindrical permanent magnet having one pair of poles N and S. Surrounding the field member 10 is an armature member rotatable relative to the field member and disposed in electrodynamic relation thereto comprising a conventional commutator 11 having $n$ segments per pair of field poles, in the specific embodiment illustrated having five segments, 11a–11e, inclusive. The armature member also includes a conventional slip ring 12 and $n$ angularly spaced open windings per pair of field poles, in this instance five open windings 13a–13e, inclusive. The windings 13a–13e, inclusive, have starting ends 13as–13es, inclusive, respectively, individually connected to the commutator segments 11a–11e, inclusive, while the other or finishing ends 13af–13ef, inclusive, are connected to a common terminal 14 which, in turn, is connected to the slip ring 12. For the purpose of illustration, each of the windings 13a–13e, inclusive, has been shown as a single open turn, although it will be understood that in practice each of these windings may be of any desired number of turns, depending upon the performance requirement of the motor, the number of turns being determined by well-known engineering formulae. By the term "open winding" is meant a winding whose circuit is normally open and is closed only through one of the commutator segments.

The armature member of the motor includes a brush 15 engaging the slip ring 12 and adapted to be connected to one of the direct-current supply terminals 16, 17, specifically to the terminal 17. The armature member also includes a pair of brushes per pair of field poles, specifically, brushes 18 and 19 engaging points of the commutator 11 spaced by approximately 180 electrical degrees which, in the two-pole embodiment illustrated, represents an angular separation of 180°. The brushes 18 and 19 may be selectively connected to the other terminal 16 of the direct-current supply circuit by means of a single-pole double-throw switch 20 which, in the position illustrated, engages its contact 20a to connect the brush 18 to the terminal 16. It is clear that, when switch 20 is operated to engage its contact 20b, it is effective to connect the brush 19 to the supply terminal 16.

The reversible direct-current motor schematically represented in the drawing and described above may be physically represented in any well-known type of motor construction. However, it is particularly adapted for embodiment in a construction of the type described and claimed in United States Letter Patent No. 2,513,410 to Arthur W. Haydon. The motor may be of the construction identical to that of the Haydon patent except for the addition of the slip ring 12 and collector brush 15 and the reconnection of the windings as described above.

It is believed that the operation of the motor described above will be apparent from the foregoing description. In brief, with the switch 20 connected as illustrated and with the terminals 16 and 17 energized with appropriate direct current, the brush 18 engaging the commutator 11 and the brush 15 engaging the collector ring 12 cause the motor to operate in a somewhat conventional manner, energizing the windings 13a–13e, inclusive, in succession as the brush 18 engages the commutator sections 11a–11e, inclusive, respectively. At any given instant, it will be noted that the circuit is completed through only a single one of the armature windings 13a–13e, inclusive. As relative rotation occurs between the armature windings and the field member 10 and as each armature winding approaches the position such that its field is substantially coaxial with the field N-S of the field member 10, the brush 18 switches the current to the next succeeding armature winding in a conventional manner.

If now the switch 20 is operated to engage its contact 20b, the brush 18 is de-energized while the brush 19 is energized and the commutator is effective to energize a winding displaced approximately 180 electrical degrees from the winding 13e, specifically, the winding 13b. Under these conditions, obviously the field of the armature winding is substantially reversed in polarity with respect to that of the winding 13a so that the motor rotates in an opposite direction.

It will be apparent that, in accordance with the physical construction selected, either the field member 10 or the armature member may be fixed and the other member rotatable with respect thereto.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a reversible direct-current motor including a field member having $p$ pairs of angularly spaced poles of opposite polarities, an armature member rotatable relative to said field member and disposed in electrodynamic relation thereto comprising: a commutator having $n$ segments per pair of field poles; $n$ angularly spaced open windings per pair of field poles disposed to develop an armature field having $p$ pairs of angularly spaced poles of opposite polarities, each having one end individually connected to a corresponding one of said commutator segments, the other ends of said windings being connected together for connection to one terminal of a direct-current supply circuit; and a pair of brushes per pair of field poles for selective connection to the other terminal of said supply circuit individually engaging said commutator at points spaced by approximately 180 electrical degrees to effect rotation of the motor in either direction.

2. In a reversible direct-current motor including a field member having a pair of angularly spaced poles of opposite polarities, an armature member rotatable relative to said field member and disposed in electrodynamic relation thereto comprising: a commutator having $n$ segments; $n$ angularly spaced open windings disposed to develop an armature field having $p$ pairs of angularly spaced poles of opposite polarities, each having one end individually connected to a corresponding one of said commutator segments, the other ends of said windings being connected together for connection to one terminal of a direct-current supply circuit; and a pair of brushes for selective connection to the other terminal of said supply circuit individually engaging said commutator at points spaced by approximately 180 degrees to effect rotation of the motor in either direction.

3. In a reversible direct-current motor including a field member having $p$ pairs of angularly spaced poles of opposite polarities, an armature member rotatable relative to said field member and disposed in electrodynamic relation thereto comprising: a commutator having $n$ segments per pair of field poles, where $n$ is an odd integer; $n$ angularly spaced open windings per pair of field poles disposed to develop an armature field having $p$ pairs of angularly spaced poles of opposite polarities, each having one end individually connected to a corresponding one of said commutator segments, the other ends of said windings being connected together for a connection to one terminal of a direct-current supply circuit; and a pair of brushes per pair of field poles for selective connection to the other terminal of said supply circuit individually engaging said commutator at points spaced by approximately 180 electrical degrees to effect rotation of the motor in either direction.

References Cited in the file of this patent

UNITED STATES PATENTS

| | | |
|---|---|---|
| 1,978,700 | Doring et al. | Oct. 30, 1934 |
| 2,334,153 | Wilson | Nov. 9, 1943 |